United States Patent
Hetcher et al.

(10) Patent No.: US 9,045,072 B2
(45) Date of Patent: Jun. 2, 2015

(54) DEBRIS LEVEL INDICATOR IN VACUUM LOADED MOBILE TANKS

(75) Inventors: Jason David Hetcher, Waukesha, WI (US); Thomas Harold Leidolf, Pewaukee, WI (US)

(73) Assignee: Super Products LLC, New Berlin, WI (US)

( * ) Notice: Subject to any disclaimer, the term of this patent is extended or adjusted under 35 U.S.C. 154(b) by 922 days.

(21) Appl. No.: 12/912,926

(22) Filed: Oct. 27, 2010

(65) Prior Publication Data

US 2011/0103901 A1 May 5, 2011

Related U.S. Application Data

(60) Provisional application No. 61/257,104, filed on Nov. 2, 2009.

(51) Int. Cl.
*B65G 53/00* (2006.01)
*B60P 1/60* (2006.01)

(52) U.S. Cl.
CPC .................................. *B60P 1/60* (2013.01)

(58) Field of Classification Search
USPC ........... 406/23, 32, 34, 39, 48, 122, 139, 151; 414/507
See application file for complete search history.

(56) References Cited

U.S. PATENT DOCUMENTS

| 4,227,893 A * | 10/1980 | Shaddock | 95/268 |
|---|---|---|---|
| 4,227,997 A * | 10/1980 | Shaddock | 209/250 |
| 4,475,848 A * | 10/1984 | Truninger | 406/115 |
| 4,574,420 A * | 3/1986 | Dupre | 15/331 |
| 4,685,868 A * | 8/1987 | Bodensteiner et al. | 417/405 |
| 4,728,922 A | 3/1988 | Christen et al. | |
| 4,751,501 A | 6/1988 | Gut | |
| 4,756,049 A * | 7/1988 | Uehara | 15/340.1 |
| 4,845,801 A * | 7/1989 | Milly et al. | 15/321 |
| 4,868,948 A * | 9/1989 | Arnold | 15/340.1 |
| 4,904,126 A * | 2/1990 | Voith | 406/39 |
| 4,935,984 A * | 6/1990 | Bryant et al. | 15/302 |
| 5,030,259 A * | 7/1991 | Bryant et al. | 55/302 |
| 5,062,868 A * | 11/1991 | Kennedy | 95/268 |
| 5,098,580 A * | 3/1992 | Andersen | 210/745 |
| 5,195,852 A * | 3/1993 | Malugani et al. | 406/153 |
| 5,536,418 A * | 7/1996 | Foss | 210/758 |
| 5,547,514 A * | 8/1996 | Ward et al. | 134/22.1 |
| 5,717,817 A * | 2/1998 | Brooks et al. | 392/451 |
| 5,755,264 A * | 5/1998 | Richards et al. | 137/899 |

(Continued)

*Primary Examiner* — Joseph Dillon, Jr.
(74) *Attorney, Agent, or Firm* — Andrus Intellectual Property Law, LLP

(57) ABSTRACT

A vacuum loader truck that includes a storage tank that can be loaded and unloaded with debris. The vacuum loader truck includes a debris level sensor that generates a sensing beam to detect the level of debris within the storage tank. The level of debris within the storage tank is determined by a control module and displayed. The debris level sensor may be an ultrasonic sensor that generates a sensing beam that is reflected off of the top surface of the debris within the storage tank. The control module determines the height of the debris within the storage tank based upon the time delay between the generation of the sensing signal and the reflected signal. The control system further includes a particle sensor to determine whether particles are entrained in the airflow from the storage tank. A pair of pressure sensors are located on opposite sides of an air filter to sense the differential pressure across the air filter. Based upon the signals from the debris level sensor, the pressure sensors and the particle sensor, the control module can control the operation of the vacuum loader truck.

3 Claims, 3 Drawing Sheets

(56) References Cited

U.S. PATENT DOCUMENTS

| | | | |
|---|---|---|---|
| 5,840,102 A * | 11/1998 | McCracken | 95/268 |
| 5,931,642 A | 8/1999 | Friedman et al. | |
| 6,082,392 A * | 7/2000 | Watkins, Jr. | 137/312 |
| 6,165,283 A * | 12/2000 | Dahlin et al. | 134/21 |
| 6,942,717 B2 * | 9/2005 | Armstrong et al. | 95/26 |
| 7,195,084 B2 * | 3/2007 | Burnett et al. | 175/66 |
| 7,390,339 B1 | 6/2008 | Warrick et al. | |
| 7,588,682 B2 * | 9/2009 | Norman | 208/391 |
| 7,886,402 B2 * | 2/2011 | Kihlstrom | 15/301 |
| 8,069,866 B2 * | 12/2011 | Moore et al. | 134/99.2 |
| 8,328,290 B2 * | 12/2012 | Malatesta et al. | 298/17 R |
| 2002/0014259 A1 * | 2/2002 | Hahnl | 134/26 |
| 2004/0221717 A1 * | 11/2004 | Armstrong et al. | 95/26 |
| 2006/0059653 A1 * | 3/2006 | Mickelson et al. | 15/340.1 |
| 2006/0179603 A1 * | 8/2006 | Polston | 15/340.1 |
| 2007/0090038 A1 * | 4/2007 | Inoue et al. | 210/241 |
| 2009/0078410 A1 * | 3/2009 | Krenek et al. | 166/244.1 |
| 2009/0183753 A1 * | 7/2009 | Maennle et al. | 134/18 |
| 2010/0147753 A1 * | 6/2010 | Baziuk | 210/126 |
| 2010/0196129 A1 * | 8/2010 | Buckner | |
| 2010/0215443 A1 * | 8/2010 | Sundholm | 406/51 |
| 2010/0218336 A1 * | 9/2010 | Kilhlstrom | 15/301 |
| 2010/0243559 A1 * | 9/2010 | Qiu | 210/603 |
| 2011/0013993 A1 * | 1/2011 | Sundholm | 406/151 |
| 2011/0180381 A1 * | 7/2011 | Fabbri et al. | 201/1 |
| 2011/0200389 A1 * | 8/2011 | Whitley | 404/101 |
| 2011/0220243 A1 * | 9/2011 | Szabo | 141/266 |
| 2012/0118411 A1 * | 5/2012 | Fraser | 137/565.01 |
| 2012/0121399 A1 * | 5/2012 | Kerr et al. | 415/203 |
| 2012/0285209 A1 * | 11/2012 | Bassile | 71/8 |
| 2012/0292257 A1 * | 11/2012 | Hartley | 210/709 |
| 2013/0025453 A1 * | 1/2013 | Kerr | 95/267 |
| 2013/0047866 A1 * | 2/2013 | Grady et al. | 100/3 |
| 2013/0078042 A1 * | 3/2013 | Sundholm | 406/41 |
| 2013/0080000 A1 * | 3/2013 | Von der Lippe et al. | 701/50 |
| 2013/0084138 A1 * | 4/2013 | Kerr | 406/10 |
| 2013/0192683 A1 * | 8/2013 | Dobson et al. | 137/14 |

* cited by examiner

DEBRIS LEVEL INDICATOR IN VACUUM LOADED MOBILE TANKS

CROSS-REFERENCE TO RELATED APPLICATION

The present application is based on and claims priority to U.S. Provisional Patent Application Ser. No. 61/257,104 filed on Nov. 2, 2009.

BACKGROUND OF THE INVENTION

The present disclosure generally relates to a vacuum loader truck. More specifically, the present disclosure relates to a system for monitoring the operation of a vacuum loader truck to determine the amount of debris contained within a storage tank of the truck.

Two of the main challenges in determining the debris level in mobile vacuum loaded tanks is the variety of the material that can be in the tank and the severe operating conditions within the tank. The range of materials includes liquids, solids, slurries, powders, mixtures, and bulky aggregates. The severe conditions include vibrations, high winds, flying debris, wet, dry, slurry, sloshing, and dirt contamination. The current state of the art in determining debris level consists of one of three methods.

The first method includes a floating ball inside the storage tank that connects to a pointer on the outside of the storage tank via a sealed pivot. This method suffers from limited range, susceptibility of the floating ball to being buried by dry material without floating, possible damage if the floating ball is in the air stream and not being effective if used forward of a baffle when de-watering is used. In such an application, the floating ball will only indicate liquid debris level forward of the ejector plate, not solid debris behind the ejector plate.

The second method includes a paddle wheel switch. This is a spinning paddle wheel inside the debris body that spins continuously until debris level reaches the wheel and prevents the wheel from turning. A paddle wheel switch indicates only one discrete level, not a range of levels and is subject to sticking and damage from flying debris. Paddle wheel switches also quickly get dirty and become ineffective.

The third method includes a sight glass to view inside of the tank. A sight glass quickly gets dirty and becomes ineffective and cannot be read remotely.

SUMMARY OF THE INVENTION

The present disclosure generally relates to a vacuum loader truck that is used to collect debris and store the debris in a storage tank. More specifically, the present disclosure relates to a system for monitoring operating parameters of the truck, such as the amount of debris contained with the storage tank, and utilizing a control module to modify operation of the truck.

Vacuum loader trucks include a vehicle chassis that includes a plurality of wheels and a storage tank mounted to the vehicle chassis. The storage tank includes an open interior that receives a collected supply of material that is transported to a remote location for disposal.

A vacuum source is in communication with the storage tank to create a partial vacuum within the storage tank to draw debris into the storage tank through a debris opening. The loader truck includes a debris level sensor that is mounted near the top end of the storage tank. The debris level sensor generates a sensing beam toward the top surface of the debris accumulated within the storage tank. The sensing beam is reflected off of the top surface of the accumulated debris and the reflected beam is sensed by the debris level sensor.

The debris level sensor is in communication with a control module. The control module determines the time delay between the generation of the sensing beam and the detection of the reflected beam. A processor contained within the control module calculates the level of debris within the storage tank based upon the time delay and the speed of the sensing beam. In one embodiment, the debris level sensor is an ultrasonic sensor. Although the control module can determine the level of debris based on signals from the debris level sensor, the debris level sensor could include a processor and directly relay the distance from the sensor to the detected material.

The control module compares the delay with a predetermined delay stored in a memory location that represents the maximum amount of debris that can be stored within the storage tank. Based upon the difference between the sensed level of debris and the threshold value, the control module can modify the operation of a blower and generate an indicator representing the amount of debris contained within the storage tank. Preferably, the indicator can be a series of lights or another type of display located either near the location of the operator or at other desired locations relative to the vacuum loader truck.

In addition to the debris level sensor, the vacuum loader truck can include first and second pressure sensors positioned on opposite sides of an air filter. The control module calculates a pressure differential between the first and second pressure sensors to determine the status of the air filter. If the pressure differential exceeds a threshold value, the control module determines that the air filter has become plugged. Alternatively, if the calculated pressure differential falls below a minimum threshold, the control module determines that the air filter is not present. The control module modifies the operation of the blower based on the determined pressure differential.

The system for monitoring the operation of the vacuum loader truck can also include a particulate sensor that determines whether particulate material is included in the airflow leaving the storage tank. The control module receives information from the particulate sensor and can modify operation of the vacuum loader truck based upon the amount of debris sensed in the airflow.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
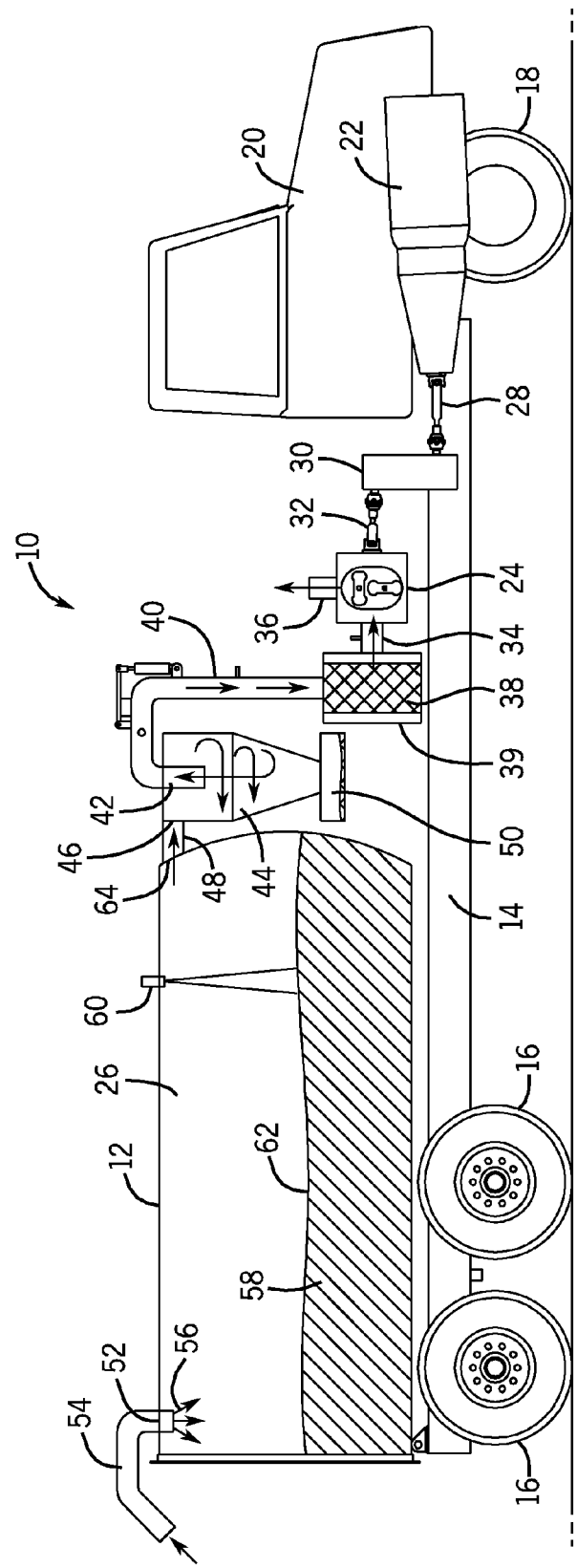
FIG. 1 is a schematic view of a vacuum loader truck including the debris level monitoring system of the present disclosure.

FIG. 1 illustrates a vacuum loader truck 10 of the present disclosure. The vacuum loader truck 10 includes a storage tank 12 mounted to a vehicle chassis 14 having a series of rear wheels 16, front wheels 18 and a truck cab 20. The truck 10 includes an engine 22 that both provides the motive force for the truck 10 and also drives a blower 24 that creates a partial vacuum within the open interior 26 of the storage tank 12. The engine 22 is coupled to the blower 24 through a first drive shaft 28, a transfer case 30 and a second drive shaft 32. Alternatively, the blower 24 could be powered from a variety of other sources, such as a hydraulic system, an electric motor or other similar power supplies.

The rotating second drive shaft 32 causes the blower 24 to draw air into the blower housing 33 through an inlet pipe 34. The air drawn into the blower 24 is discharged through a blower exhaust 36.

The flow of air entering into the inlet pipe 34 first passes through an air filter 38 contained within housing 39. The air filter 38 removes any particulate matter contained within the flow of airstream created by the blower 24. Air filter 38 receives the flow of air from a transition pipe 40. The inlet end 42 of the transition pipe 40 is positioned within a cyclone separator 44. The cyclone separator 44 receives airflow at an inlet 46 from an outlet pipe 48 that is in fluid communication with the open interior 26 of the storage tank 12. As the flow of air enters into the cyclone separator 44 through the outlet pipe 48, particles entrained within the airflow are separated by centrifugal force and/or gravity and accumulate in the lower section 50. The airflow, through the cyclonic action of the separator 44, flows out of the separator 44 through the inlet end 42 of the transition pipe 40.

When the blower 24 is running, air is withdrawn from within the enclosed, open interior 26 of the storage tank 12. The blower 24 creates a partial vacuum within the open interior 26, which creates an inflow of air through a debris and air inlet 52. The speed at which the blower 24 operates controls the flow rate of debris into the open interior 26. A supply hose 54 is connected to the debris inlet 52 such that air and debris can be drawn into the open interior 26 through the debris inlet 52, as illustrated by arrows 56 in FIG. 1.

As illustrated in FIG. 1, debris 58 accumulates within the open interior 26 of the storage tank 12 and begins to fill the storage tank after a period of use of the vacuum loader truck 10. Since the volume of the storage tank 12 is limited, it is important to determine the level of debris 58 within the storage tank 12 and signal to the operator of the vacuum loader truck 10 when the storage tank reaches its maximum level. When the amount of debris in the storage tank 12 reaches the maximum level, the loading ceases and the tank is ultimately emptied.

Figure 2:
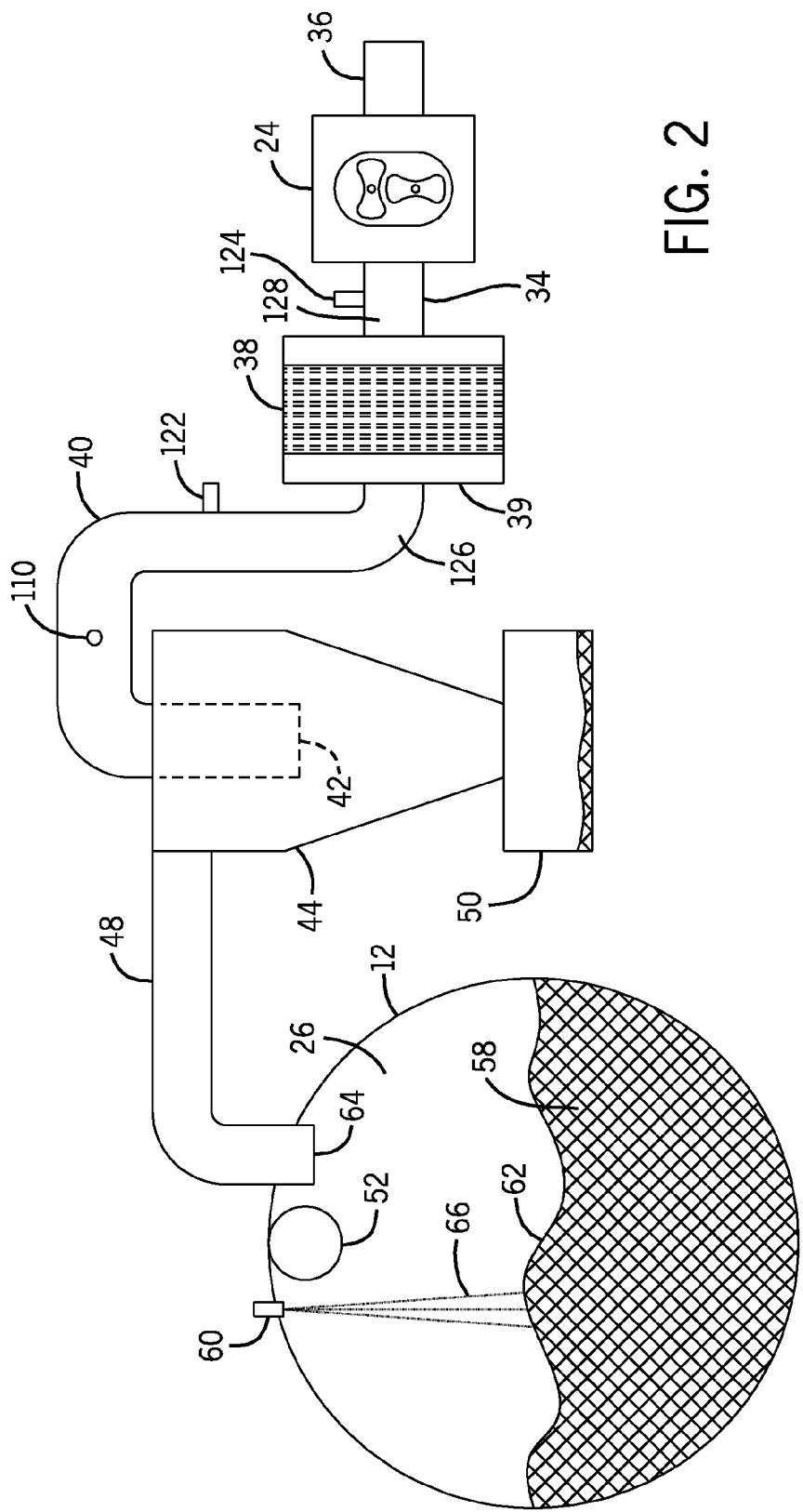
FIG. 2 is a schematic illustration of the components of the debris level monitoring system.

As illustrated in FIGS. 1 and 2, the vacuum loader truck 10 includes a debris level sensor 60 that is operable to detect the level of the debris 58 within the storage tank 12. As illustrated in FIGS. 1 and 2, the accumulated debris 58 may include an uneven top surface 62 since the debris can include particulate matter, liquid, or varying combinations of solid and liquid matter. The debris level sensor 60 must be able to determine the level of liquid, solid and slurries within the storage tank 12. As illustrated in FIG. 1, the debris level sensor 60 is positioned near the outlet 64 from the storage tank 12.

In the embodiment shown in FIGS. 1 and 2, the debris level sensor 60 generates a sensing beam 66 that is reflected off of the top surface 62 of the debris 58 and is reflected toward the debris level sensor 60. Various different types of beams, such as light, sound or radio could be used with varying levels of effectiveness depending upon the debris material and the conditions that exist within the open interior 26 of the storage tank 12. In one preferred embodiment of the disclosure, the debris level sensor 60 is an ultrasonic sensor that generates an ultrasonic sensing beam toward the top surface 62 of the debris 58. The ultrasonic sensing beam contacts the top surface 62 and a reflected beam travels back to the sensor 60. The ultrasonic sensor detects a reflected beam that is returned from the top surface 62. The time delay between the generation of the sensing beam and receipt of the reflective beam is directly proportional to the distance between the debris level sensor 60 and the top surface 62 of the debris 58. As the level of debris rises within the open interior 26 of the storage tank 12, the delay required for the reflective beam to be received by the debris level sensor also decreases.

As previously described, during operation of the truck, the open interior 26 within the storage tank exists at a partial vacuum. Since the speed of sound waves is generally constant at normal atmosphere pressures and at partial vacuums, the use of an ultrasonic sensor as the debris level sensor is desirable. Although the speed of sound through air depends on temperature, the temperature within the open interior 26 will change only a relatively small amount such that the temperature change will not adversely affect the use of an ultrasonic sensor as the debris level sensor 60. Although the speed of sound waves depends upon the pressure and the density of air, these two values are directly related ($c=K*T*P/q$) and cancel each other out in the calculation for speed of sound.

Figure 3:
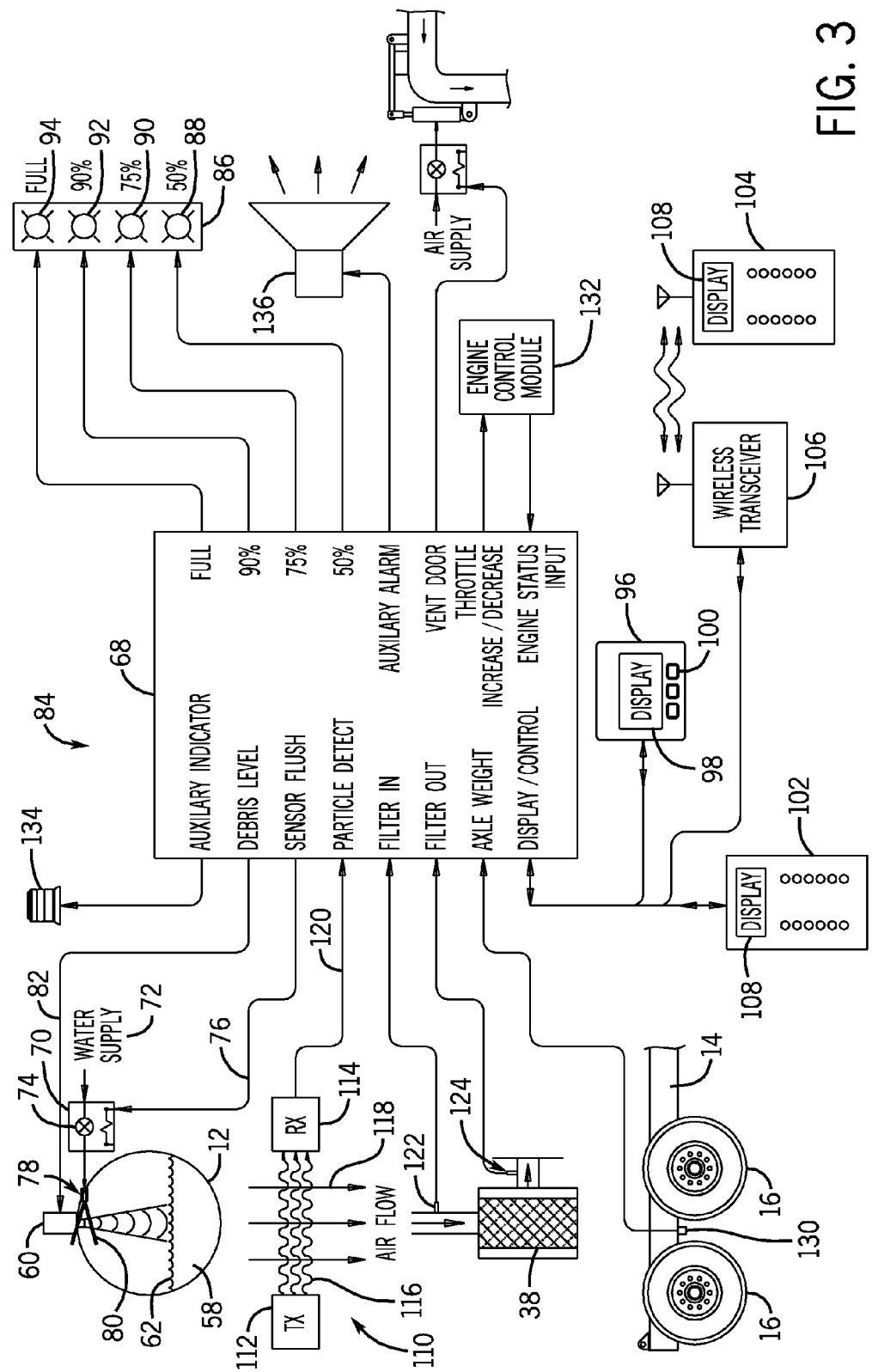
FIG. 3 is a schematic illustration showing the operative components and control module of the debris level monitoring system.

An ultrasonic debris sensor is currently contemplated as useful for the debris level sensor since the ultrasonic sensor includes a sound emitting disk that vibrates to effectively repel liquid, solid and slurry debris when mounted within the top of the storage tank 12. As illustrated in FIG. 3, the debris level sensor 60 is connected to a control module 68 such that information from the debris level sensor 60 is relayed to the control module 68 for processing. In the embodiment illustrated in FIG. 3, the control module 68 includes an internal processor that receives various different inputs from a variety of sensors and modules and is capable of generating output signals to various devices, as will be described in greater detail below. Various different types of processors are contemplated as being useful within the control module 68.

In the embodiment illustrated in FIG. 3, the debris level sensor 60 includes a flushing device 70 for cleaning the surface of the sensor should the surface become dirty. The flushing device 70 is connected to a water supply 72 through a control valve 74. The position of the control valve 74 is controlled by the control module 68 through communication line 76. When the control module 68 determines that the debris level sensor 60 needs to be cleaned, the control valve 74 is opened and the supply of water 72 flows through nozzle 78. The nozzle 78 creates a cleaning stream 80 that cleans debris off of the surface of the debris level sensor 60. The control module 68 can either clean the sensor 60 at predetermined intervals or when the signals received from the sensor along line 82 are inconsistent and/or full of noise.

When the debris level sensor 60 is properly operating, the debris level sensor 60 returns information to the control module 68 related to the time delay from the generation of the sensing beam to receipt of the detection beam. The processor within the control module 68 calculates the distance between the debris level sensor 60 and the top surface 62 of the debris 58 based on this delay and the speed of sound. Alternatively, the sensor 60 could include a processing unit such that the signal sent from the sensor 60 to the control module 68 would indicate the distance from the sensor to the sensed surface. In such an embodiment, the control module 68 would not need to determine this distance. The control module 68 includes a threshold value stored in a memory location which relates to the maximum height of debris 58 contained within the storage tank 12.

Although an ultrasonic debris level sensor 60 is shown and described, it is contemplated that a mechanical sensor could also be used to detect the top surface of the accumulated material in the storage tank. In such an embodiment, the mechanical sensor would relay information to the control module 68 regarding the height of debris in the storage tank. Based on the sensed amount of debris in the storage tank, the control module 68 can take various actions with respect to the operation of the vacuum loader truck as will be described below.

In addition to the single debris level sensor 60, it is contemplated that the system could include a combination of sensors to detect both the level of solid debris in the storage tank and the level of liquid in the storage tank. Since the accumulated liquid is primarily water, the liquid stored in the storage tank can be discharged into a sewer. Thus, it would be useful for the operator to know the relationship between liquid volume and solid material volume in the storage tank. If the liquid can be discharged into the sewer, the operator can continue to load the storage tank without having to leave the work area to empty the tank.

In such an embodiment, the system could include a first debris level sensor to detect the liquid level in the tank and a second debris level sensor to detect the level of solid material. It is contemplated that the second debris level sensor could be a mechanical sensor to detect the level of solids in the tank. The first debris level sensor would detect the top surface of the liquid in the tank and the control module could then relay this information to the operator. Further, a single sensor could be selected that could sense both the liquid and solid volume levels in the storage tank.

In yet another embodiment, a separate debris sensor could be positioned on each side of the moving ejector plate (not shown) in the storage tank. The two debris sensors would be able to determine the liquid level on one side of the ejector plate and the solid level on the opposite side of the ejector plate. This information could be used to monitor the loading of the storage tank.

The debris level sensor 60 shown in FIG. 2 detects the top surface 62 of the debris as described. However, when the debris is primarily solids, the accumulated debris may not be level in the storage tank 12. As an example, the debris may accumulate and form a hill near the debris inlet 52. If the inlet 52 is close to the sensor 60, the sensor may prematurely indicate that the level of debris in the tank is approaching the maximum threshold value. To solve this problem, the vacuum loader truck can include a device to level the debris in the storage tank. Such a device could be a vibration assembly or a movable ejector plate, or any similar structure.

As illustrated in FIG. 3, the control system 84 includes a debris level indicator 86 that displays a plurality of levels of debris in the storage tank. In the embodiment shown, the debris level indicator 86 includes a first indicator light 88 associated with a 50% fill level, a second indicator light 90 associated with a 75% fill level, a third indicator light 92 associated with a 90% fill level and a fourth indicator light 94 associated with a completely full storage tank. The control module 68 determines that the storage tank 12 is completely full when the sensed distance between the debris level sensor 60 and the top surface 62 reaches the predetermined threshold value, which is preset depending upon the size of the storage tank 12.

In the embodiment shown in FIG. 3, the debris level indicator 86 is positioned near the operator of the truck such that an operator can view the level of debris within the storage tank. Although four separate lights 88-94 are shown in the embodiment of FIG. 3, the debris level indicator 86 could be replaced by different types of displays, such as an LED segment display or other similar types of displays that change their appearance or value depending upon the level of debris sensed within the storage tank 12.

In the embodiment shown in FIG. 1, the control system includes a control panel 96 having a display 98 and a series of input switches 100. The control panel 96 is preferably located near the operator of the truck such that the display 98 can be viewed by the operator and input selections entered through the control panel 96. It is contemplated that the level of debris within the storage tank could also be displayed on the display 98 in addition to the debris level indicator 86.

In addition to the control panel 96, the control system 84 includes a wired remote control 102 and a wireless remote control 104. The wired remote control communicates directly to the control module 68 through a wired connection while the wireless remote control communicates to the control module through a wireless transceiver 106. Both of the remote controls 102, 104 allow an operator to control operation of various functions of the vacuum loaded truck 10 from a remote location, such as at the end of the collection hose. Each of the remote controls 102, 104 may include a display 108 that could display the fill level of the storage tank.

Referring back to FIG. 2, the control system of the present disclosure further includes a particle sensor 110 positioned within the transition pipe 40 and/or 48. The particle sensor 110 can be positioned anywhere between the storage tank 12 and the blower 24. However, in the embodiment shown in FIG. 2, the particle sensor 110 is positioned between the cyclone separator 44 and the air filter 38. The particle sensor 110 is positioned at this location since much of the debris in the airflow leaving the storage tank 12 is removed by the cyclone separator 44 and accumulated within the lower section 50.

In the embodiment shown, the particle sensor 110 is a laser or optical particle sensor. The sensor 110 functions to sense particles within the airstream leaving the cyclone separator 44. Preferably, the particle sensor 110 will not detect any material during normal operation since the function of the cyclone separator 44 is to remove such material from the airstream. However, depending upon the debris being collected, particles may be within the airstream within the transition pipe 40.

The detailed configuration of the particle sensor 110 is shown in greater detail in FIG. 3. As illustrated in FIG. 3, the particle sensor 110 includes a transmitter 112 and a receiver 114. The transmitter emits a series of light waves 116 in a direction transverse to the airflow 118. When particles pass between the transmitter 112 and the receiver 114, the particles block the light rays 116, which is detected by the receiver 114. The receiver 114 is in communication with the control module 68 through communication line 120. If the communication module 68 detects an increasing amount of particles within the airflow, the control module 68 can either signal to the user the increased particle presence or take action to modify the operation of the debris loader.

Referring back to FIG. 2, the control system further includes a first, upstream pressure sensor 122 and a second, downstream pressure sensor 124 located on opposite sides of the air filter 38. The pair of pressure sensors 122, 124 act as a differential pressure gauge to measure the pressure differential between the filter inlet 126 and the filter outlet 128. A baseline pressure differential is stored in the memory of the control module. The baseline pressure differential indicates a normal, clean air filter condition. A pressure difference less than the baseline pressure differential indicates a missing filter. As illustrated in FIG. 3, the pair of sensors 122, 124 are in communication with the control module 68. If the control module 68 detects a pressure difference less than the baseline pressure differential, the control module 68 sends a signal to one of the displays 98, 108 indicating that the air filter 38 is missing.

In addition to sensing for a missing air filter, the control module 68 monitors the pressure signals from the sensors 122 and 124 to determine if the pressure difference across the air filter 38 exceeds a maximum pressure differential allowed per the air filter manufacturer's recommendation. A pressure differential above a maximum indicates a plugged air filter 38. When the air filter 38 becomes plugged, the control module 68 again signals the operator and potentially slows down or deactivates the blower.

In addition to monitoring for a pressure differential below a minimum or above a maximum, the control module 68 can also monitor the rate of change of the pressure differential across the air filter 38. If the pressure differential is increasing more rapidly than a predetermined level, the control module 68 would determine that too much material is leaving the cyclone separator. The control module 68 could then adjust the machine settings until the pressure differential rate of change is an acceptable value.

The control system 84 further includes a weight sensor 130 mounted to the chassis 14 between the rear wheels 16. The weight sensor 130 relays a signal to the control module 68 that informs the control module 68 of the overall weight of the truck. Based upon the overall weight sensed by the weight sensor 130, the control module 68 can make calculations to determine the density of the material being collected based upon the weight from the sensor 130 and the calculated volume of material in the storage tank, as determined by the height of material from the debris level sensor 60. Although the weight sensor 130 is shown positioned between the pair of rear wheels 16, the weight sensor 130 could be located at other locations on the truck.

The control module 68 shown in FIG. 3 is connected to the engine control module 132 such that the control module 68 can receive input from the engine control module and control operation of the engine throttle. Additionally, the control module 68 can be connected to a beacon light 134 and an audible alarm 136. The beacon light 134 and the audible alarm 136 are particularly useful when the operator is utilizing either the wired remote control 102 or the wireless remote control 104 to control operation of the vacuum loader truck. Since the operator may be located away from the truck, the beacon light 134 presents a visual alarm while the audible alarm 136 can be heard by the operator. Additionally, the operator could be notified by some type of device that vibrates when the level of debris approaches the maximum allowable level.

The control module 68 shown in FIG. 3 can be set up to read various different sensors and other machine inputs. The control module converts this information into usable information to control the machine and to inform the operator. Thus, the control module 68 receives sensor readings/input and controls various operating functions of the vacuum loader truck based on this inputs or readings. In the embodiment shown, the sensor input is from a sensor that monitors the level of debris in the storage tank. However, other sensor inputs can be received by the control module, such as from the weight sensor, the particulate sensor or the pressure sensors on opposite sides of air filter. Based on the signals from these sensors, the control module 68 adjusts the operation of systems components, such as the speed of the blower.

The control module can be programmed for different body sizes, materials, sensor positions, machine setup configurations or operator preferences. As an example, the control module can be modified for operation using different levels of material density. As an example, the following settings could be utilized:

| Setting | Debris Material | Debris Characteristics |
| --- | --- | --- |
| 1 | Fly-ash | Fine, light, and dry |
| 2 | Sand | Coarse, light, and dry |
| 3 | Mud | Heavy and wet |

The above inputs are an example of the "Auto-Set" feature of the advanced smart truck products; whereby operators make user friendly decisions and the control system makes machine setup decisions and adjusts the machine accordingly to maximize performance and/or efficiency.

Although the control module will typically operate in one of the automatic modes set forth above, the control module also allows the operator to manually override the system settings in anyone of the "Auto-Set" modes described above. When the operator overrides the system, the operator can manually control the operation of the vacuum loader truck as desired.

We claim:

1. A system for monitoring the operation of a vacuum loader truck including a storage tank and a vacuum source in fluid communication with the storage tank, wherein the vacuum source operates to create a partial vacuum within the storage tank to draw debris into the storage tank, the system comprising:
   a debris level sensor mounted at a top end of the storage tank, wherein the debris level sensor generates a sensing beam downward toward a bottom end of the storage tank to sense a distance to a top surface of the debris in the storage tank;
   a control module connected to the debris level sensor to receive a signal from the debris level sensor and determine a level of debris in the storage tank, wherein the control module generates an output signal to a visual display that visually indicates the determined level of debris in the storage tank; and
   a flushing device positioned to direct a flow of water onto the debris level sensor to clear the debris level sensor, wherein the flushing device is in communication with the control module.

2. A vacuum loader truck, comprising:
   a vehicle chassis having a plurality of wheels;
   a storage tank mounted to the vehicle chassis and having an open interior to receive a supply of debris through a debris opening;
   a vacuum source in communication with the storage tank to create a partial vacuum within the storage tank to draw debris into the storage tank through the debris opening;
   a debris level sensor mounted at a top end of the storage tank, wherein the debris level sensor generates a sensing beam downward toward a bottom end of the storage tank to sense a distance to a top surface of the debris in the storage tank;
   a control module connected to the debris level sensor to receive a signal from the debris level sensor and determine a level of debris in the storage tank, wherein the control module generates an output signal to a visual display that visually indicates the determined level of debris in the storage tank; and a flushing device positioned to direct a flow of water onto the debris level sensor to clear the debris level sensor, wherein the flushing device is in communication with the control module.

3. A system for monitoring the operation of a vacuum loader truck including a storage tank and a vacuum source in fluid communication with the storage tank, wherein the vacuum source operates to create a partial vacuum within the storage tank to draw debris into the storage tank, the system comprising:
- a debris level sensor mounted at a top end of the storage tank, wherein the debris level sensor generates a sensing beam downward toward a bottom end of the storage tank to sense a distance to a top surface of the debris in the storage tank;
- a control module connected to the debris level sensor to receive a signal from the debris level sensor and determine a level of debris in the storage tank; and
- a flushing device positioned adjacent to the debris level sensor and operable to clear the debris level sensor of debris.

\* \* \* \* \*